United States Patent
Cooklev

(10) Patent No.: US 6,633,617 B1
(45) Date of Patent: Oct. 14, 2003

(54) DEVICE AND METHOD FOR COMPENSATING OR CREATING DOPPLER EFFECT USING DIGITAL SIGNAL PROCESSING

(75) Inventor: Todor Cooklev, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/316,516

(22) Filed: May 21, 1999

(51) Int. Cl.$^7$ .................. H04L 27/06; G01S 13/58; G01S 15/00
(52) U.S. Cl. .................. 375/344; 342/105; 367/90
(58) Field of Search .................. 375/344, 316, 375/349; 455/182.2, 192.2; 331/36 C, 36 L, 1 A; 332/126; 342/199, 99, 105, 84, 171, 357.05; 340/554; 367/90, 94

(56) References Cited

U.S. PATENT DOCUMENTS

| | | | |
|---|---|---|---|
| 4,472,785 A | 9/1984 | Kasuga | 364/718 |
| 5,337,363 A | 8/1994 | Platt | 381/17 |
| 5,548,296 A | 8/1996 | Matsuno | 342/457 |
| 5,633,993 A | 5/1997 | Redmann et al. | 395/119 |
| 5,636,283 A | 6/1997 | Hill et al. | 381/17 |
| 5,642,732 A | 7/1997 | Wang | 128/661.07 |
| 5,647,366 A | 7/1997 | Weng | 128/661.09 |
| 5,719,944 A | 2/1998 | Banerjea | 381/61 |
| 5,732,044 A * | 3/1998 | Jarvis | 367/134 |
| 5,891,036 A * | 4/1999 | Izumi | 600/441 |
| 6,219,376 B1 * | 4/2001 | Zhodzishsky et al. | 375/148 |

OTHER PUBLICATIONS

Cooklev et al, *Wavelets and Differential—Dilation Equations*, Manchester, England, IEEE of Great Britain, 1996.
Harte et al, *Cellular and PCS/PCN Telephones and Systems*, APDG Publishing, Fuquay–Varina, North Carolina, pp. 76–79, 1996.
Lim et al, "On–Line Interpolation Using Spline Functions," *IEEE Signal Processing Letters*, vol. 3, No. 5, May 1996.
Crochiere et al, *Multirate Digital Signal Processing*, (©1993 Prentice–Hall, Inc., Englewood Cliffs, New Jersey), pp. 39–41.
Steele, *Mobile Radio Communications*, (©1992, IEEE Press, New York), pp. 106–111.

* cited by examiner

Primary Examiner—Khai Tran
(74) Attorney, Agent, or Firm—Michaelson & Wallace; Peter L. Michaelson

(57) ABSTRACT

Doppler shift compensation by interpolation of a new sample between successively received signal samples using stored values of an interpolation function. The interpolation function has a non-zero amplitude in an argument range symmetrical about zero argument and zero amplitude outside the range. The time location of a new sample is shifted relative to a pair of received signal samples by an amount corresponding to a Doppler shift. The amplitude of the new sample is computed at a new sample index by combining the pair of received signal samples with corresponding samples of the interpolation function, each corresponding sample of the interpolation function being that sample whose argument is a difference between a corresponding one of the first and second indices and the new sample index. Due to the symmetry properties of the interpolation function, this operation requires as little as two multiply operations and one add operation for each new sample. The interpolation function is generated by performing successive dilations and convolutions of a pulse function.

30 Claims, 6 Drawing Sheets

DEVICE AND METHOD FOR COMPENSATING OR CREATING DOPPLER EFFECT USING DIGITAL SIGNAL PROCESSING

BACKGROUND OF THE INVENTION

The Doppler effect is an apparent change in the frequency of propagating waves occurring when a transmitter and a receiver are in motion relative to each other. It causes an increase in the frequency when the transmitter and receiver approach each other and a decrease when they move apart.

The Doppler effect applies in general to all types of propagating waves. Some systems advantageously utilize its effect, while it can introduce undesirable effects in others. One area where the Doppler effect can produce undesirable effects is communications systems, particularly in mobile communication systems.

The third generation of mobile communication systems, known until recently as the Future Public Land Mobile Telecommunication Systems (FPLMTS), and recently renamed International Mobile Telecommunications 2000 (IMT-2000), uses a variety of cell structures from very small indoor picocells to large outdoor terrestrial cells and finally to global satellite coverage. An adaptive radio interface is envisaged for IMT-2000 to optimize performance in these widely differing propagation conditions. This adaptation will be controlled by software using digital signal processing technology. While a detailed description of IMT-2000 is outside of the scope of this invention disclosure, embodiments of the present invention relate to the following components of IMT-2000:

- terminal mobility, i.e. the ability to move continuously over large areas while maintaining the ability to use multimedia telecommunication services, video, audio, speech. The speed of movement of multimedia terminals may vary from zero to very high.
- High-bandwidth services (data, image, multimedia, etc.)
- Intra and inter system handover, i.e. roaming across dissimilar networks;
- Service adaptation. No longer will the various elements of the radio interface (coding, modulation, etc.) have fixed parameters, but they can be selected, negotiated and matched according to the requirements of the service and the instantaneous capability of the radio channel.

When there is any motion between the transmitter and receiver in mobile communication systems, the Doppler frequency shift is experienced between the transmitted and received frequency. This causes the frequency content of the received signal to be different from the frequency content of the transmitted signal. In analog cellular communications, this Doppler effect matters little, but it significantly affects digital phase transmission and equalizer operations Therefore, in addition to overcoming multipath distortion, an equalizer must overcome phase and amplitude distortions arising from the Doppler effect. The Doppler effect manifests itself as a random frequency modulation of the transmitted signal and can cause significant impairment of the original signal.

Much research has been done to determine the speed and direction of a moving object. One suitable approach for mobile cellular communications that can be applied at base stations is described in U.S. Pat. No. 5,548,296, by Matsuno, entitled METHOD OF AND APPARATUS FOR DETERMINING POSITION OF MOBILE OBJECT AND MOBILE RADIO COMMUNICATION SYSTEM USING THE SAME, issued on Aug. 20, 1996, assigned to Nippon Steel Corp., herein incorporated by reference in its entirety. Another approach, the result of a very recent work performed at Lucent Technologies, is applicable when it is desirable to obtain an estimate of the Doppler speed at the mobile unit.

In addition to mobile communications, there are other applications where the Doppler effect causes degradation and needs to be compensated, e.g. acoustics, radar, etc. Other work relevant in this respect is described in U.S. Pat. No. 5,642,732, assigned to Acuson Corporation of Mountain View, Calif. and in U.S. Pat. No. 5,647,366, assigned to Siemens Medical Systems, Inc., of Iselin, N.J.

Furthermore, in other applications, digital signal processing may be used to create a Doppler effect. For example, this technique is employed in three dimensional sound systems such as in U.S. Pat. No. 5,337,363, by Platt.

In prior art systems there are two basic digital signal processing approaches to compensate the Doppler effect: processing in the frequency domain and processing in the time domain.

Processing in the frequency domain, illustrated in FIG. 1A, requires that the signal is passed through a fast Fourier transformer, a frequency shifter, and an inverse fast Fourier transformer to produce a signal without degradation due to the Doppler effect. From a multirate digital signal processing point of view the task to compensate a Doppler effect is equivalent to changing the sampling rate by a rational factor. Suppose we have a signal x(n), defined for n=0, ..., N−1. We are looking for another signal x̂ (m) of duration LN/M. The Doppler parameters determine the sampling rate change factor according to:

$$\frac{M}{L} = 1 + \frac{V_t \cos\theta_t - V_r \cos\theta_r}{V} \qquad (1)$$

where, as illustrated in FIG. 1B, $\theta t$ is the speed of the transmitter, $V_r$ is the speed of the receiver, $\theta_t$ is the direction of travel of the transmitter and $\theta_r$ is the direction of travel of the receiver, and V is the speed at which the signal travels. For electromagnetic waves V=c, while acoustic signals travel at a much slower speed. Both M and L should preferably be integers. Their ranges are determined in accordance with well-known principles. Since the right side of equation (1) is not guaranteed to be a ratio of two integers, in practice this method can only approximate the exact Doppler shift. The frequency shift step of FIG. 1A is carried out as illustrated in FIG. 2. First, a signal with Doppler shift is received. The first processing step is interpolation by a factor of L, in which L−1 samples are inserted between every two samples and L−1 samples are added after the last sample. This step is accomplished by computing the DFT of x(n), corresponding to the step in FIG. 2 labelled "compute the DFT of X(n)".

Then the DFT of $x_1(m)$ is:

$$X_1(k) = \begin{cases} LX(k), & \text{if } 0 \leq k < \frac{N}{2} \\ \frac{L}{2}X(k) & \text{if } k = \frac{N}{2} \\ 0, & \text{if } \frac{N}{2} < k < lN - \frac{N}{2} \\ \frac{L}{2}X(k-(L-1)N), & \text{if } k = LN - \frac{N}{2} \\ LX(k)-(L-1)N), & \text{if } LN - \frac{N}{2} < k < LN \end{cases} \quad (2)$$

Thus, the DFT of X(n) is computed by applying the above formula in the step of FIG. 2 labelled "apply formula 2".

The Nyquist component is weighted by L/2, to preserve the Hermitian symmetry. The next step is the decimation by a factor of M. From the DFT $X_1(k)$ this can be performed as:

$$X_2(k) = \begin{cases} X_1(k), & \text{if } 0 \leq k < \frac{LN}{2M} - 1 \\ |X_1(k)|, & \text{if } k = \frac{LN}{2M} \\ X_1(k+N(M-1)/M), & \text{if } \frac{LN}{2M} + 1 < k < \frac{LN}{M} - 1. \end{cases} \quad (3)$$

Thus, the decimation by a factor of M is performed by applying the above formula in the step of FIG. 2 labelled "apply formula 3".

Finally, the inverse DFT of $X_2(k)$ gives the desired signal $X_2(m)$, which is free of the Doppler shift. Of course, the two steps represented by equations or formulas (2) and (3) above can be combined into one. In the case when it is necessary to create a Doppler effect, the processing steps are the essentially same. This requires significant computing resources. While the frequency-domain approach is feasible for narrow-band speech, the amount of necessary computations makes it unfeasible for wide-band signals.

Time-domain Approach

A time-domain approach is described in U.S. Pat. No. 5,719,944, by Banerjea, entitled SYSTEM AND METHOD FOR CREATING A DOPPLER EFFECT, issued on Feb. 17, 1998, assigned to Lucent Technologies, Inc., of Murray Hill, N.J., herein incorporated by reference in its entirety. This approach requires that the signal be upsampled, filtered and then downsampled. The downsampling ratio is determined by the Doppler parameters. The interpolation factor L is chosen relatively freely, e.g. depending on the desired resolution level, and then the decimation factor is chosen as discussed in U.S. Pat. No. 5,719,944. The time-domain approach for changing the sampling rate is described in considerable detail in the book *Multirate Digital Signal Processing*, by R. Crochiere and L. Rabiner, published by Prentice-Hall, Englewood Cliffs, N.J., 1983, herein incorporated by reference in entirety. The application of this method to the problem of creating or compensating the Doppler effect is described in U.S. Pat. No. 5,719,944.

The time domain approach is illustrated in FIG. 3. The first step is interpolation, which can be followed by a filter, and the second step is decimation, resulting in a signal without Doppler shift. In practice these steps can be combined into one step with the same functionality. The time domain approach can be more efficient than the frequency-domain approach for short lengths of the filter impulse response. With short filters, however, the compensation of the Doppler effect will be poor.

A major disadvantage of both the time-domain and the frequency-domain approaches is that the sampling rate conversion factor must be a ratio of two integers L and M. Since in practice, of course, the Doppler shift is not guaranteed to assume only certain values which correspond to the conversion factor being a ratio of two integers, these two approaches can only approximate the Doppler effect, but cannot cancel it exactly.

Furthermore, the time-domain approach requires that a multirate digital filter be designed. The cutoff frequency of this filter depends, in addition to other factors such as the frequency of transmission, on the speed between the transmitter and the receiver. This speed will vary with time. As a result, the filter will have to be re-designed every time the speed and/or the direction of movement changes. The re-design of this filter every time is very inconvenient and computationally expensive. Normally, it is prohibitively expensive to be implemented on a single low-end digital signal processor, which must perform other signal processing tasks.

Another possible approach is based on spline functions. A recent implementation of this technique is presented by T. J. Lim and M. D. Macleod, in "On-line Interpolation Using Spline Functions," *IEEE Signal Processing Letters*, vol. 3, No. 5, pp 144–146, 1996. This technique can be viewed as a variation of the time-domain approach. The principle behind spline-based techniques is the use of a polynomial of order N to model the continuous function between two consecutive sampled values under the condition that the endpoint values of the polynomial equal the two samples and that all derivatives up to order N−1 are continuous across the boundary between two intervals. This approach, however, while avoiding the re-design of a filter, requires the re-calculation of the spline coefficients. The implementation of this technique is quite complicated, requiring 13 multiplications and 18 additions per sample.

Thus, it is desirable to devise a novel digital signal processing (DSP) method and device to compensate the undesirable frequency shift due to the movement between the transmitter and receiver to ensure stabilized communication, given an estimate of the relative speed and position between the transmitter and receiver.

It is known among those skilled in the field of digital signal processors that no method or device is perfect, i.e. as a result of the non-ideal compensation of the undesirable effect there will be an error. Thus, it is Ad also desirable that this error term be as small as possible. Furthermore, there is a need for low complexity methods and devices. Ultimately, there is a need for an approach which simultaneously is lower in complexity and models the Doppler effect more accurately than previous approaches.

Such improved methods and devices could have benefits in mobile communications, in three-dimensional sound systems to improve creation of Doppler effect, in teleconferencing applications where there is movement the person speaking, or in other similar digital signal processing applications such as sonar, radar and seismic exploration, other vehicle information and communication systems, the global positioning system (GPS), etc.

SUMMARY OF THE INVENTION

In a preferred embodiment, the present invention provides a device for digital signal processing having a Doppler shift compensator capable of interpolating Doppler compensated samples from samples of a received Doppler shifted signal sampled at a system sampling rate using values representing a symmetric interpolating function stored in memory prior to receiving the received signal. The Doppler compensated samples are capable of being processed at the system sampling rate to provide a Doppler compensated signal. In one of the preferred embodiments, the Doppler shift compensator is capable of providing samples of Doppler compensated signals by multiplying successive Doppler shifted samples by stored values of the interpolating function and summing the results. Such an embodiment can provide precise Doppler compensated samples using two multiplications and one summation.

In a preferred method of the present invention, a method is provided for interpolating between a pair of successively received signal samples to compensate for Doppler shift. In a preferred embodiment, this method includes storing plural samples of an interpolation function in an argument range symmetrical about zero argument and having zero amplitude outside the range. This method is carried out by sensing a Doppler shift in the received signal and determining a time location of a new sample having a new sample index between the pair of received signal samples, the time location being shifted relative to the pair of signal samples by an amount corresponding to the Doppler shift. The amplitude of the new sample is computed at the new sample index by combining the pair of received signal samples with corresponding samples of the interpolation function. In this computation, each corresponding sample of the interpolation function is that sample whose argument is a difference between a corresponding one of the first and second indices and the new sample index.

In preferred embodiments and methods of the present invention, the values representing the interpolation function may be generated from a pulse function by performing successive dilations and convolutions such that a function prior to a dilation is convolved with a result of the dilation. The result of the convolution is then dilated and convolved with the pre-dilated result. Successive dilations and convolution will provide values representing the interpolation function. Such values may be stored in non-volatile memory. It is preferred to use an interpolating function that is symmetrical. This allows less than the entire function to be stored in memory. As such, in one preferred embodiment, fifty values representing one quarter of the interpolating function may be stored to precisely compensate for Doppler shift.

Thus, the preferred embodiments and methods provide digital signal processing to compensate the undesirable frequency shift due to the movement between the transmitter and receiver so as to ensure stabilized communication given an estimate of the relative speed and position between the transmitter and receiver. The need for such embodiments and methods arises in mobile communications and also may be desirable in teleconferencing applications.

The foregoing embodiments of the present invention may be used to create a Doppler effect in a received signal. In this case, the step of sensing a Doppler shift is sensing the amount of Doppler shift that is desired to be introduced into the signal to provide, for example, simulated three-dimensional sound. The present invention and its methods and embodiments are immediately applicable to other areas, where similar digital signal processing is involved, such as sonar, radar and seismic exploration. The present invention and its methods and embodiments also can be used in other applications such as vehicle information and communication systems, the global positioning system (GPS), etc.

DETAILED DESCRIPTION

Figure 4A:
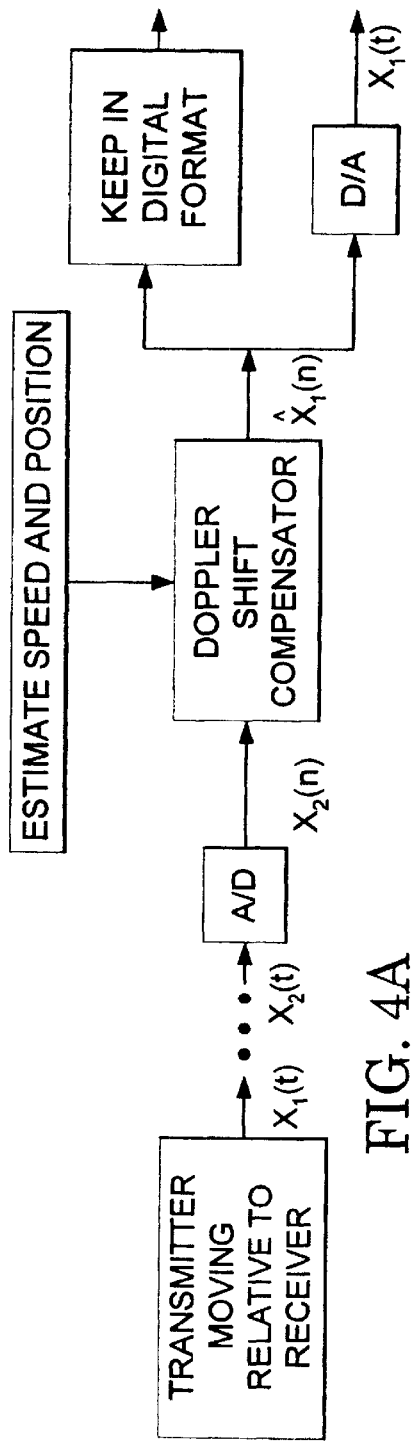
FIG. 4A illustrates a system embodying the present invention in one aspect.

Exemplary apparatus employed in carrying out a preferred method of the present invention is illustrated in FIG. 4A. The transmitter produces a signal $x_1(t)$. Assuming that the receiver, or the transmitter, or both, move with respect to each other, the signal will appear to the receiver as having a different frequency content compared to the signal emitted by the transmitter. Thus, the signal that arrives at the receiver, $x_2(t)$, suffers from degradation due in part to the Doppler effect. The physical medium in which the signal is transmitted can be any type of medium. The received signal $x_2(t)$ is first converted to a digital signal $x_2(n)$. We are looking for a way to process $x_2(n)$ to a obtain a digital signal $x_1(n)$, representing as close as possible the transmitted signal $x_1(t)$.

Figure 4B:
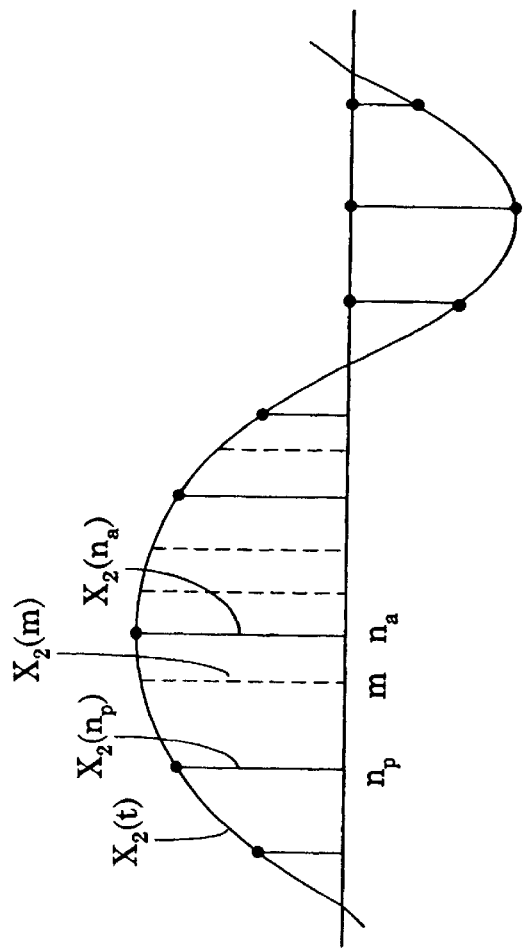
FIG. 4B illustrates the waveform sampling carried out in the system of FIG. 4A.

Turning to FIG. 4B, with the preferred method of the present invention, the received signal $x_2(t)$ is sampled at a system sampling rate to produce $x_2(n)$. Doppler corrected samples are computed from values of $x_2(n)$ by computing values of $x_2$ at Doppler shifted indices m. Each Doppler shifted index m is located in time between a pair of received signal samples $x_2(n_p)$ and $x_2(n_a)$. Its location (i.e., where m is placed relative to $n_p$ and $n_a$ in the graph of FIG. 4B) is determined in accordance with the sampling rate change factor of Equation (1). The sample indices m and n each correspond to different sampling rates, n corresponding to the system sampling rate. The ratio of the respective sampling rates of the sample indices m and n is the sampling rate change factor of Equation (1). The value of $x_2$ at sample index m is interpolated using samples $x_2(n_p)$ and $x_2(n_a)$ to provide a Doppler shift corrected sample $x_2(m)$. All the Doppler corrected samples $x_2(M)$ thus obtained are processed (or "played back") at the system sampling rate to produce a Doppler corrected signal $\hat{x}_1(n)$.

Preferred Interpolating Method

The invention employs an interpolating function $\phi(t)$ governed by the following equation:

$$f(t) = \sum_l f(l)\phi(t-l) \qquad (4)$$

It is known that there are infinitely many interpolating functions. Not all of them, of course, have convenient properties. Some of them are of infinite length, and are avoided in practice. One interpolating function is the rectangular function, the Fourier transform of which is the sinc function. The properties of this function are well known. It has poor interpolation properties, as it leads to a piece-wise linear interpolation. Usually a low-pass filter is added to smooth the result.

T. Cooklev et al., in "Wavelets and Differential-Dilation Equations," *Int. Conf. Signal and Image Processing*, Manchester, England, 1996, herein incorporated by reference in its entirety, found that the function which ids a solution to the differential-dilation equation:

$$\frac{d\phi t}{dt} = 2[\phi(2t+1) - \phi(2t-1)] \qquad (5)$$

is an interpolating function with some desirable and unique properties: (1) it has excellent time-domain and frequency-domain localization properties and (2) it can approximate polynomials much better than any other function with similar localization properties.

There is no analytic expression for the solution $\phi(t)$. Its Fourier transform is given by:

$$\Phi(\omega) = \prod_{i=1}^{\infty} \mathrm{sinc}(\omega/2^i) - \prod_{i=1}^{\infty}\prod_{k=1}^{\infty}\cos\frac{\omega}{2^{i+k}}. \qquad (6)$$

Figure 5A:
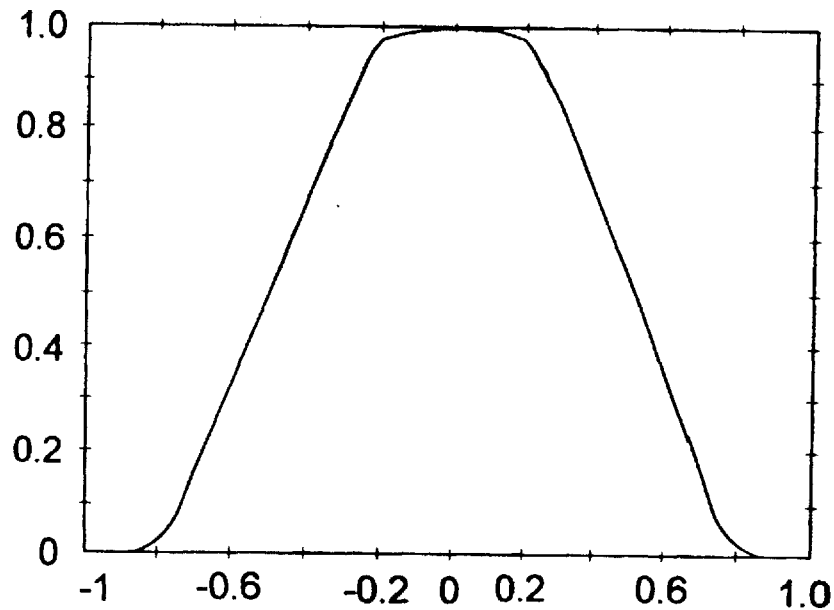
FIG. 5A illustrates the interpolation function employed in a preferred embodiment.
Figure 5B:
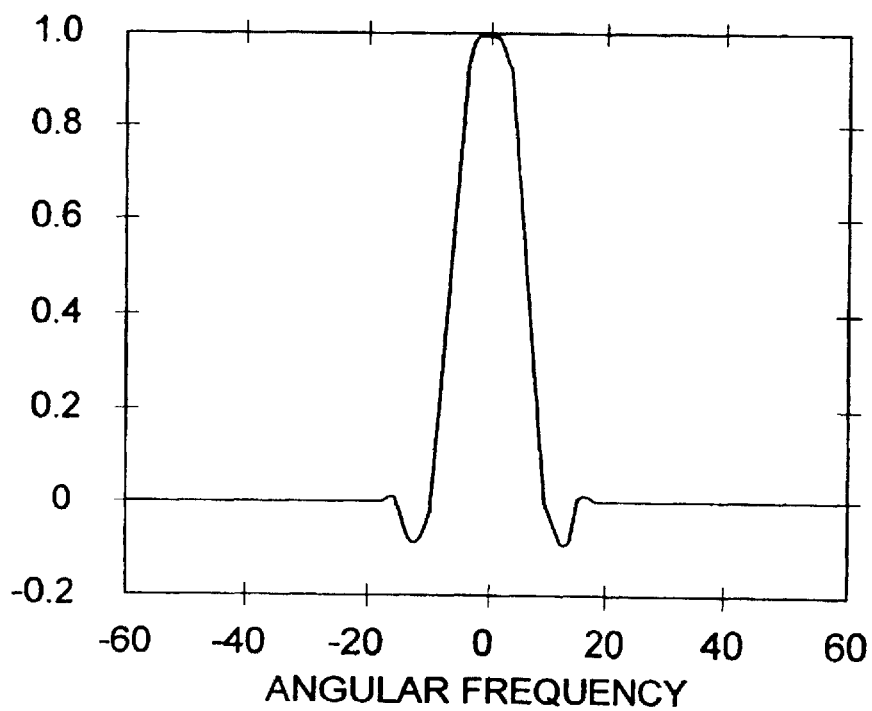
FIG. 5B illustrates the frequency spectrum of the interpolation function of FIG. 5A.

FIGS. 5A and 5B illustrate graphs of the function $\phi(t)$ and its Fourier transform respectively.

Some splines are also interpolating functions, but the function represented by equation (5) is fundamentally superior to spline functions in this usage. For example, the time-domain localization of splines gets poorer with the increase of their order. Their frequency domain localization is also worse than $\Phi(\omega)$.

Furthermore, in "Wavelets and Differential-Dilation Equations," it was shown that the function $\phi(t)$ has a very interesting property: by dilations and translations of the function $\phi(t)$, polynomials of any order can be represented. In other words, if $P_N(X)$ is a polynomial of order N, then there are constants $c_k$, such that:

$$P_N(x) = \sum_k c_k \phi\left(\frac{x-k}{2^N}\right). \qquad (7)$$

The above summation is finite, due to the finite support of the function $\phi(x)$. This is very important, because most signals can be considered to be polynomials or combination of polynomials of some order.

Note that the wavelets disclosed by I. Daubechies in Ten Lectures on Wavelets, CBMS-NSF Regional Conf. in Appl. Math., vol. 61, SIAM, Philadelphia, Pa., 1992, herein incorporated by reference, have a similar property: by dilations and translations they can represent polynomials up to a certain order. Splines also have a similar property, known as the Strang-Fix property in spline theory, and later found to be closely related to the above property of wavelets.

An advantage of the preferred method of the present invention is that the interpolation function $\phi(t)$ can represent polynomials of any order by translations and dilations. There is no upper limit on the order of polynomials that can be represented, and this is precisely what is desirable in practice. Indeed, most signals can be modeled as polynomials of some order, or a combination of them, although the order of these polynomials is not known in advance.

In addition, compared to orthogonal wavelets, the interpolation function $\phi(t)$ has the advantage of being symmetric and smooth. In fact, the function $\phi(t)$ is infinitely differentiable.

Another advantageous property of the preferred method of the present invention is that:

$$\sum_{k=-\infty}^{\infty} \phi(t-k) = 1, \qquad (8)$$

which is actually a special case of Equation (7), since the constant 1 is a polynomial of zeroth order.

A Preferred Method of the Present Invention

Figure 6:
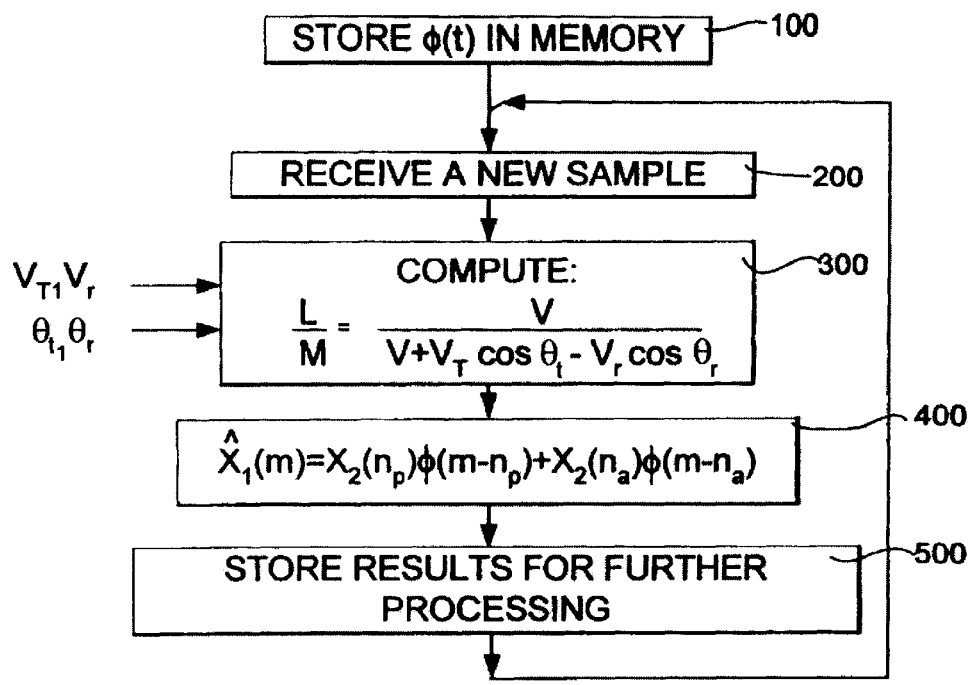
FIG. 6 illustrates a process carried out in the invention.

FIG. 6 shows a block diagram of the preferred method of the present invention. In this method, values representing the function $\phi(t)$ are generated, and then stored in memory as illustrated in block 100 of FIG. 6. The argument, t, of the function $\phi(t)$ is a continuous variable, but we do not need an infinite amount of memory to store the function values. In practice using one hundred or two hundred values of the function $\phi(t)$ is sufficient. This is equivalent to discretizing the function $\phi(t)$ on a very fine grid.

Figure 7A:
FIG. 7A illustrates a dilation process employed in producing the interpolation function of FIG. 5A.
Figure 7B:
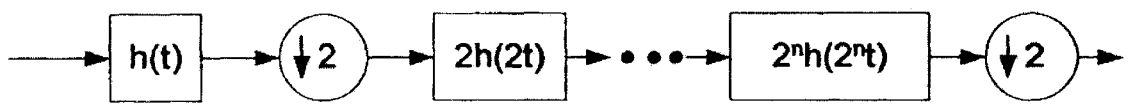
FIG. 7B illustrates a process of successive dilations and convolutions employed in producing the interpolation function of FIG. 5A.

To describe the algorithm for the computation of the function $\phi(t)$, it is useful to define a continuous-time dilator as illustrated in FIG. 7A. Note that the block in FIG. 7A is purely a mathematical tool that is only conceptually similar to the discrete-time decimator. Note also that, by definition, the continuous-time dilator performs amplification in addition to dilation. Suppose now that the blocks of continuous-time filtering and dilation are cascaded and iterated as shown in FIG. 7B. The properties of this iteration are known in the prior art in the discrete-time domain. Note that such continuous-time iterations without dilating blocks, however, have trivial properties and have been used numerous times (in particular in the construction of continuous-time spline functions). On the other hand, the presence of dilating blocks yields interesting non-trivial properties.

If we start with a continuous-time system with an impulse response of:

$$h(t) = \begin{cases} 1/2 & 1 \leq t < 1 \\ 0 & \text{otherwise} \end{cases} \quad (9)$$

and continue the iteration of this continuous-time system followed by a continuous-time dilator to infinity, the impulse response of the resulting system will be equal to $\phi(t)$:

$$\phi(t) = \lim_{i \to \infty} \phi_i(t) = \lim_{i \to \infty} 2^{i+(i-1)+\ldots+1}[h(2^i t) \ast h(2^{i-1} t) \ast \ldots \ast h(2t)] \quad (10)$$

As such, $\phi(t)$ may be generated by successive dilations and convolutions of h(t). In other words, h(t) is dilated and the result convolved with h(t). The result of the convolution is dilated and convolved with the result of the prior convolution, and so on. FIG. 7A, discussed further below, is a simplified functional representation of a single dilation by a factor of 2. FIG. 7B is a simplified functional representation of successive dilations and convolutions of h(t).

In a computer implementation, of course, the function h(t) will be represented by a set of discrete values. The implementation of the so-called continuous-time dilator is straight-forward. It is neither necessary nor possible to perform the iteration in FIG. 7B an infinite number of times. In the preferred method, we have found six iterations to be sufficient, although it is possible to use more.

An advantage of the preferred method is that it is possible to compute the set of samples representing the function $\phi(t)$ once and not in real-time, although other implementations are possible. Thus, a set of discrete values representing $\phi(t)$ may be stored in a non-volatile memory device of the target system if desired. A further advantage of the preferred method is that $\phi(t)$ is symmetric with respect to 0. In addition, $\phi(t)$ is also symmetric with respect to 0.5: $\phi(t)+\phi(1-t)=1$ when the variable t is between 0 and 1. As a result, we need to store only one quarter of the function values, as the other three-quarters are easily determined. So, ultimately storing the function $\phi(t)$ takes 50 memory locations.

Figure 1A:
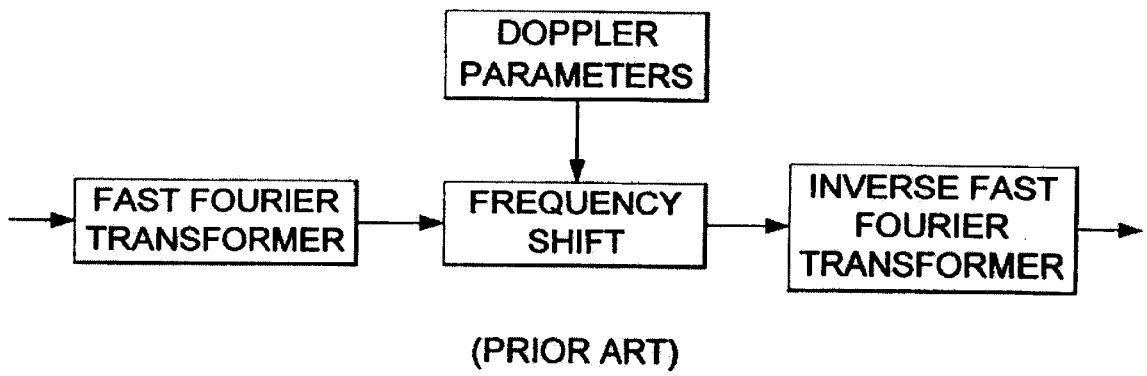
FIG. 1A illustrates a conventional Doppler correction frequency domain technique.
Figure 1B:
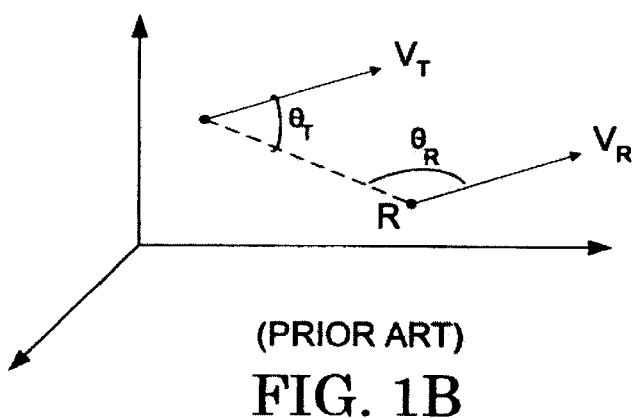
FIG. 1B illustrates the geometry of the Doppler shift problem.
Figure 2:
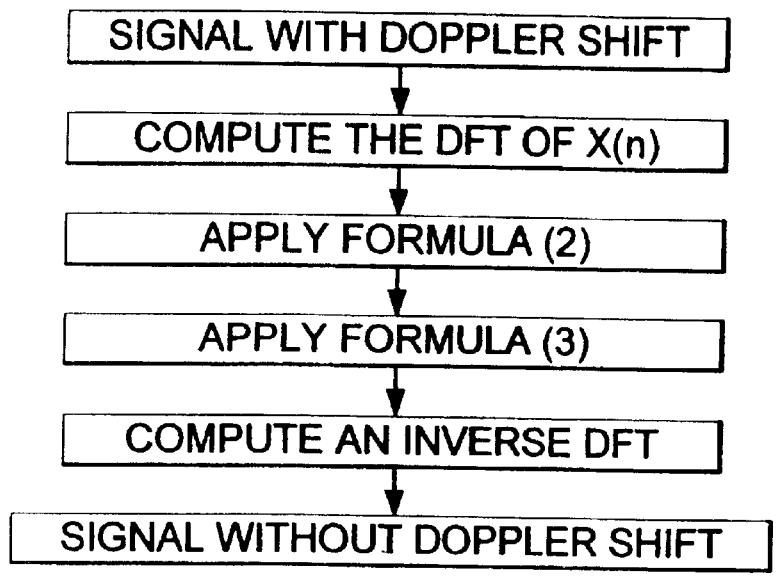
FIG. 2 illustrates the steps in carrying out the technique of FIG. 1A.
Figure 3:
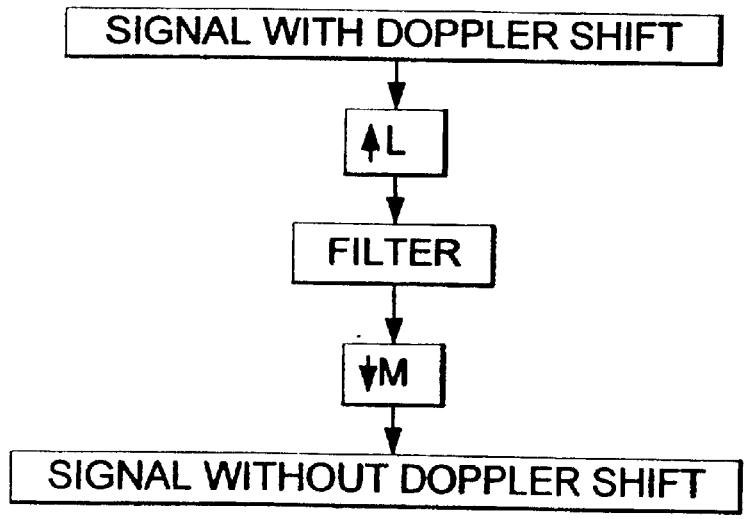
FIG. 3 illustrates a conventional time domain Doppler correction technique.

In block 200 of FIG. 6, a new sample of the signal is received. The frequency of the received signal includes a Doppler shift component derived from the relative movement of the transmitter with respect to the receiver. In the preferred embodiment the signal is a radio wave. In other embodiments of this invention, this may be an acoustic signal. More generally there may be more than one receiver. The Doppler shift component detected by each of the receivers will be different depending not only on the relative speed between the transmitter and each of the receivers, but also on the position of the transmitter with respect to the receivers, as shown illustrated in FIG. 1B. A receiver situated along the direction of movement will detect a large Doppler shift component. A receiver situated perpendicular to the direction of movement detects a smaller Doppler shift component. Among those receivers which detect a large Doppler shift component, the receivers which the transmitter is approaching will notice an increase of the frequency, whereas those receivers, from which the transmitter is moving away will detect decrease of the frequency.

In block 300 of FIG. 6, a Doppler shift factor L/M is computed as follows:

$$\frac{L}{M} = \frac{V}{V + V_t \cos\phi_t - V_r \cos\phi_r} \quad (11)$$

This corresponds to the sampling rate change factor of Equation (1). Here, $\phi_t$ and $\phi_r$ are the directions of travel of the transmitter and receiver, respectively. $V_t$ and $V_r$ are the velocities of the transmitter and receiver, respectively, while V is the propagation velocity of the signal.

The step of block 400 of FIG. 6 is the computation of one sample of the corrected signal $$\hat{x}(t) = \hat{x}_1(m) = \sum_{n=1}^{N} x_2(n)\phi(t-n) \quad (12)$$

at the time instant $$t = \frac{L}{M} n = \frac{V}{V + V_t \cos\phi_t - V_r \cos\phi_r} = m \quad (13)$$

Clearly this can be any time instant. Due to the finite support of the function $\phi(t)$, the number of terms in this summation is finite. Remarkably, in the preferred embodiment, the number of terms in the summation is only two, as illustrated in block 400 of FIG. 6.

To establish this, we compute or interpolate a sample at the time instant m for which $n_p$ is the index of the actual sample immediately preceding the time instant m, and $n_a$ is the index of the actual sample immediately following the time instant m. In this case, $n_a = n_p - 1$. Then equation (12) becomes:

$$\hat{x}_1(m) = \ldots + x_2(n_p)\phi(m-n_p) +$$
$$+ x_2(n_p-1)\phi(m-(n_p-1)) + x_2(n_p-2)\phi(m-(n_p-2)) + \quad (14)$$

Now, the function $\phi(t)$ not only has finite support, but the support is equal to two. (The support is the closed interval [−1, 1]). In the above summation of products all but two products will be equal to zero. Suppose that $\phi(m-n_p) \neq 0$. Then at most one of $\phi(m-(n_p-1))$ or $\phi(m-(n_p+1))$ will be different from zero. All the other values in Equation (14) such as $\phi(m-(n_p-2))$, $\phi(m-(n_p+2))$, etc. will be equal to zero. As a result, in the preferred embodiment, the computation requires only two multiplications and one addition:

$$\hat{x}_1(m) = X_2(n_p)\phi(m-n_p) + x_2(n_a)\phi(m-n_a). \quad (15)$$

The above equation may be implemented by computing the arguments $m-n_a$ and $m-n_p$ and using values for $\phi$, computed as discussed above, closest to $m-n_a$ and $m-n_p$. In a preferred embodiment, previously stored values of $\phi$ which are the closest in time to m−$n_a$ and m−$n_p$ among all the stored samples may be retrieved from memory and used to evaluate Equation (15). This is simple to implement on a digital signal processor. Thus, the computational complexity of the preferred embodiment is just two multiplications and one addition per output sample. This is considerably more efficient compared with the cost of doing one forward and one inverse FFT per block of samples, and even compared with the cost of doing time-domain filtering.

The Doppler corrected signal may then be stored for further processing, as illustrated in block 500. Then system is ready to accept a new input sample and calculate a new Doppler shift component, which may be different from the one in the previous computation.

Because of the properties of the interpolation function $\phi(t)$, not only can we accept any values for the Doppler shift, but any real-time changes in the Doppler shift can be done without border distortions. The absence of border distortions is due to the small support of the function $\phi(t)$. In prior art approaches, border distortions are present whenever the Doppler parameters change. This is because several calculated samples will be far from the precise values. As such, they require several samples to pass before the method adapts to the change and calculates more precise samples. Such a transitional period is absent in the preferred embodiment of the present invention, because the summation is reduced to only two summations.

Furthermore, because of the reduced amount of processing steps required in the preferred embodiment, processing time delays may be reduced to provide a high quality real time Doppler corrected signal.

It should be noted that although in the preferred embodiment the function $\phi(t)$ was obtained starting from $$h(t) = \begin{cases} 1/2 & -1 \leq t < 1 \\ 0 & \text{otherwise,} \end{cases} \quad (16)$$

there are other functions which have similar properties. For example, starting from $$h_A(t) = \begin{cases} \frac{1}{2(A-1)} & \text{if } -(A-1) \leq t \leq A-1 \\ 0 & \text{otherwise} \end{cases} \quad (17)$$

we can obtain a family of functions with Fourier transforms $$\Phi_A(\omega) = \prod_{i=1}^{\infty} H\left(\frac{\omega}{A^i}\right). \quad (18)$$

In general, A may take any value. These functions can be used as interpolating functions, however, only if A is an integer strictly greater than 1. Thus, A can be 2, 3, 4, and so on.

In the preferred embodiment, $\phi(t)$ corresponds to A=2. In other embodiments the interpolating function will have support equal to 2(A−1). In those other embodiments, the support will be wider than the support of the preferred embodiment, thus requiring more computations.

In a preferred embodiment, compensating the Doppler effect may be implemented entirely using digital signal processing. With a preferred method, the Doppler shift compensator uses as input the relative speed between the transmitter and receiver and the position of the transmitter. After the signal is processed according to the preferred method, the resulting signal is free of the distortion introduced by the Doppler effect. In another embodiment, the Doppler shift compensator may be used to insert a selected Doppler shift into the resulting signal to produce simulated transmitter/receiver motion. This is equivalent to the process of compensating for a Doppler shift in that in both types of processes the frequency content of the input signal is shifted. In this case, selecting the Doppler shift merely requires specifying the parameters of Equation (11) and (13), and the frequency content shift is carried out as described above. In preferred embodiments of the present invention, the method of the present invention allows for simultaneously much more precise, flexible, and computationally simple Doppler compensation than the previously developed approaches.

EXAMPLE

The preferred method is simple to implement using a digital signal processor, such as the 16-bit fixed point processors TMS320C54x, manufactured by Texas Instruments, Inc. of Dallas, Tex. Because of its lower computational cost, the preferred method advanced here also is less prone to errors due to the finite precision of the computations.

Suppose that Δf=250 Hz, which is the Doppler frequency shift experienced by a signal sent at 3 GHz if the relative motion between the transmitter and receiver is 25 m/s (55.9 miles per hour) and the signal bandwidth is 4000 Hz. Without loss of generality it is assumed that the receiver is stationary and the transmitter is approaching the receiver (θ=0). The receiver will notice a frequency shift up by Δf. The same Doppler shift would be the result of moving at a speed of approximately 88 miles per hour at 1900 Mhz. In other embodiments of the present invention, corresponding to sound signals and perhaps different propagation environments, the same Doppler shift frequency would be obtained for different speeds of the transmitter relative to the receiver.

Figure 8:
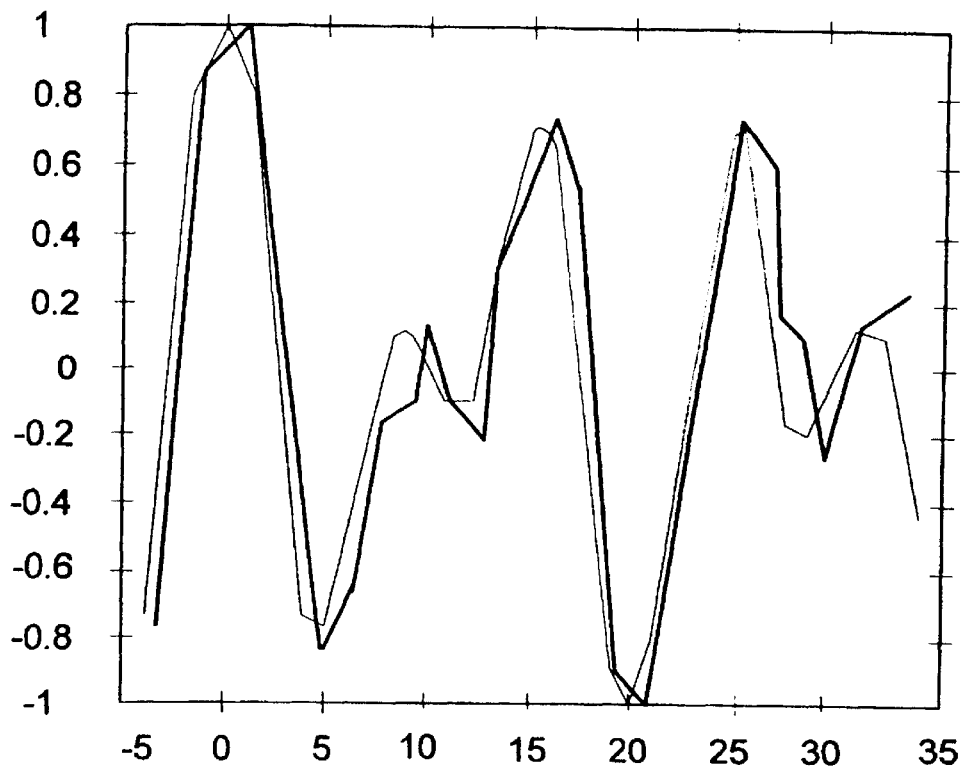
FIGS. 8 and 9 illustrate, for the purpose of comparison, results obtained in a conventional technique and in accordance with the invention, respectively.

To perform a comparison using the above parameters we designed a filter with 25 coefficients and implemented the time-domain approach described in the above-mentioned U.S. Pat. No. 5,719,944, assigned to Lucent Technologies, Inc. The filter was designed using the widely used Parks-McClellan algorithm for optimal in the minimax sense FIR filters. FIG. 8 illustrates the results of the conventional time-domain method. The light dotted line is the true signal, without distortion due to the Doppler effect. The dark solid line is the signal computed according to the time-domain method. While different filters will lead to slightly different results, FIG. 8 is a good illustration of the outcome. While in theory it is possible to further optimize the filter taking into account the Doppler effect and the signal being processed, this is not possible in real-time. We have compared the error between the true signal, $x_1(n)$, free of the Doppler effect, and the computed signal $\hat{x}_1(n)$ for both approaches.

The example of FIG. 8 is a carefully chosen example, in which the Doppler effect corresponds to precise integer values of M and L. This is not the case in practice and consequently the method will be much less precise in real-time practical operation. Note also that this method normally requires 13 multiplications and 25 additions per output sample, assuming the most efficient implementation of multirate filters.

Figure 9:
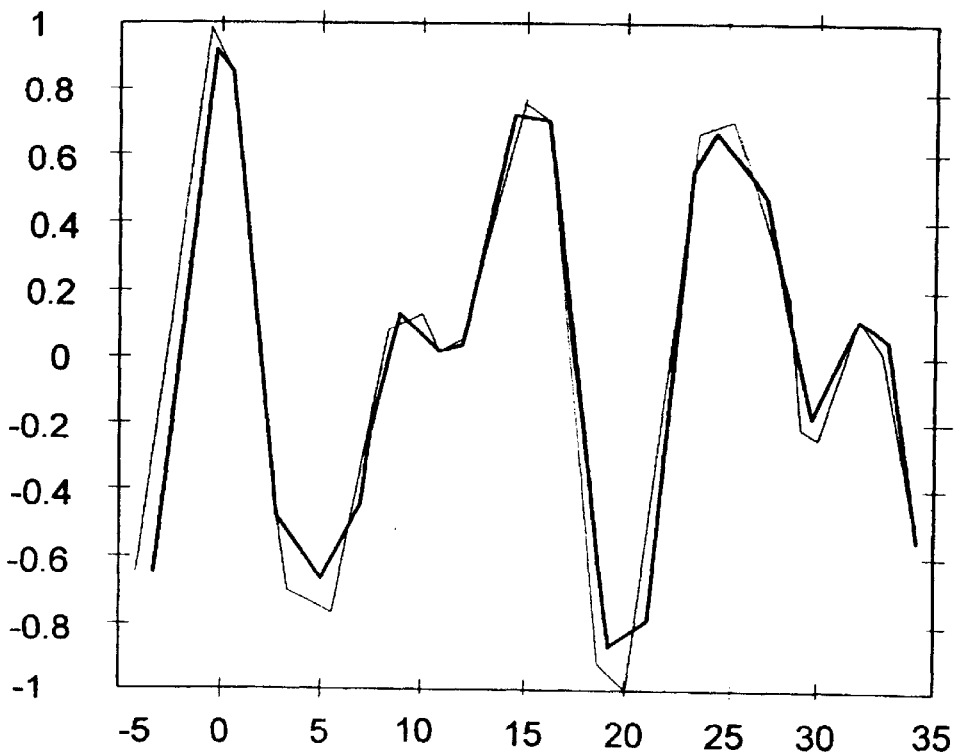

FIG. 9 illustrates a result obtained using the present invention, and it is clearly a much more precise representation of the transmitted signal. The light dotted line is the true signal, without distortion due to the Doppler effect. The dark solid line is the signal computed in accordance with a preferred method of the present invention.

Thus, the preferred embodiment of the present invention provides an improved approach to change the sampling instances of digital signals. The preferred method is ideally suited to compensating the Doppler effect in mobile communications. The present invention can also be directly used in other applications like radar, sonar, vehicle identification systems, the global positioning system (GPS), and even teleconferencing applications in which the person speaking is moving. In all of these cases the received signal will be impaired by a Doppler effect, the canceling of which will improve the quality of communications.

In addition, it can also be used in situations where it is desirable to create a Doppler effect. In one such embodiment, the Doppler effect may be inserted in accordance with the present invention to simulate movement in a three dimensional sound system, using the same method.

The preferred approach has the advantages, among others, of high-quality and simplicity.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A method for interpolating between a pair of successively received signal samples of first and second sample indices, respectively, in accordance with a Doppler shift, comprising:

storing plural samples of a correction function in a first argument range symmetrical about zero argument, the function having zero amplitude outside the first argument range;

computing the Doppler shift and determining a time location of a new sample having a new sample index between the pair of received signal samples, the time location being shifted relative to the pair of signal received samples by an amount corresponding to the Doppler shift;

computing an amplitude of the new sample at the new sample index by combining the pair of received signal samples with corresponding samples of the correction function, each corresponding sample of the correction function being that sample whose argument is a difference between a corresponding one of the first and second indices and the new sample index.

2. The method of claim 1 wherein the argument range of the correction function corresponds to a maximum of the difference between the new sample index and a system sampling index.

3. The method of claim 1 wherein each index of the first and second samples is an integer, and wherein the argument range is from about −1 to about +1.

4. The method of claim 1 wherein the step of computing an amplitude consists of a minimum number of multiply and add operations.

5. The method of claim 4 wherein the step of computing an amplitude consists of only two multiply operations and one add operation.

6. The method of claim 1 wherein the correction function is generated by successive dilations and convolutions such that a function prior to a dilation is convolved with a result of the dilation, and wherein the correction function is generated using a pulse function.

7. The method of claim 6 wherein the dilations are performed using a dilation factor of 2.

8. The method of claim 6 wherein the pulse function has a non-zero amplitude in a second argument range symmetrical about zero argument, the function having zero amplitude outside the second argument range.

9. The method of claim 8 wherein the second range is between +1 and −1.

10. A method for compensating for frequency shift in a received signal, comprising:

storing plural samples of a correction function in an argument range symmetrical about zero argument, the function having zero amplitude outside the argument range;

sampling the received signal $x_2(n)$ having a system sampling index n corresponding to a system sampling rate n;

computing a Doppler shift and determining a new sampling rate corresponding to a new sampling index m, the new sampling rate related to the system sampling rate in accordance with the Doppler shift;

generating a corrected signal by computing for each corrected sampling index m a new amplitude $x_1(m)$ by combining at least some samples of the received signal $x_2(n)$ with corresponding samples of the correction function, each corresponding sample of the correction function being that sample whose argument is a difference between the new sampling index m and the respective system sampling index n.

11. The method of claim 10 wherein the argument range of the symmetric function corresponds to a maximum of the difference between the new sampling index and the system sampling index.

12. The method of claim 10 wherein each sampling index is an integer, and wherein the argument range is from about −1 to about +1.

13. The method of claim 10 wherein the corrected signal generating step combines less than all of the samples of the received signal with corresponding ones of the samples of the correction function.

14. The method of claim 13 wherein the corrected signal generating step combines only a previous sample and a next sample of the received signal relative to the corrected sampling index m with corresponding samples of the correction function.

15. The method of claim 14 wherein the corrected signal generating step consists of a minimum number of multiply operations.

16. The method of claim 15 wherein the corrected signal generating step consists of only two multiply operations.

17. The method of claim 10 wherein the correction function is generated by successive dilations and convolutions such that a function prior to a dilation is convolved with a result of the dilation, and wherein the correction function is generated using a pulse function.

18. The method of claim 17 wherein the successive dilations are performed using a dilation factor of 2.

19. The method of claim 17 wherein the pulse function has a non-zero amplitude in a second argument range symmetrical about zero argument, the function having zero amplitude outside the second range.

20. The method of claim 19 wherein the second argument range is between +1 and −1.

21. A method for compensating for Doppler shift in a received signal comprising:
   a) receiving a Doppler shifted signal so as to define the received signal;
   b) generating samples of the received signal by sampling the received signal at a system sampling rate; and
   c) generating a Doppler corrected sample using the samples of the received signal by performing the following steps:
      (i) determining a Doppler corrected sample index;
      (ii) multiplying a sample of the received signal evaluated at a prior sample index by an interpolation function evaluated at a difference between the Doppler corrected sample index and the prior sample index;
      (iii) multiplying a sample of the received signal evaluated at a next sample index by the interpolation function evaluated at a difference between the Doppler corrected sample index and the next sample index; and
      (iv) summing the result of steps (ii) and (iii) to provide corrected samples capable of being processed at the system sampling rate to produce a Doppler compensated signal.

22. The method of claim 21 wherein the interpolation function is produced by the following steps:
   a) selecting a pulse function;
   b) performing a dilation of an input function so as to define a dilated input function;
   c) performing a convolution of the input function and the dilated input function to provide a result; and
   d) performing steps b) and c) successively to generate values for the interpolation function using the pulse function as an initial value for the input function and the result of the convolution as a value for the input function for each successive dilation.

23. The method of claim 22 wherein selecting a pulse function comprises selecting a function $$h_A(t) = \begin{cases} \dfrac{1}{2(A-1)} & -(A-1) \leq t \leq A-1 \\ 0 & \text{otherwise.} \end{cases}$$

24. The method of claim 22 wherein generating values for the interpolation function comprises the step of selecting the pulse function so that the interpolation function has values within a range from 0 to 1 for a variable within a range of from −1 to 1.

25. The method of claim 22 wherein generating values for the interpolation function comprises selecting a function $$h(t) = \begin{cases} 1/2 & -1 \leq t < 1 \\ 0 & \text{otherwise} \end{cases}$$

and wherein the dilation is performed using a factor of 2.

26. The method of claim 21 wherein determining the Doppler corrected sample index comprises multiplying a Doppler sampling rate change factor by a system sample index.

27. The method of claim 26 wherein the sampling rate change factor equals a velocity of propagation of the received signal divided by a sum of the velocity of propagation and a relative velocity between a transmitter and a receiver of the received signal.

28. The method of claim 21 wherein generating the Doppler corrected sample comprises a computation of:

$$\hat{x}_1(m) = x_2 n_p(\phi(m-n_p) + x_2(n_a)\phi(m-n_a),$$

where
   $\hat{x}_1(m)$ is the the Doppler corrected sample,
   $n_p$ is a previous sample,
   $n_a$ is a next sample,
   $x_2(n_p)$ is a value of the received signal at $n_p$,
   $x_2(n_a)$ is a value of the received signal at $n_a$, and $$m = \frac{L}{M}n$$

is the Doppler corrected sample index.

29. The method of claim 28 wherein the interpolation function is a function $\phi(t)$, wherein $\phi(t)$ is a solution to:

$$\frac{d\phi t}{dt} = 2[\phi(2t+1) - \phi(2t-1)],$$

and further comprising using generated values of $$\phi(t) \text{ for } \phi(m-n_p) \text{ and for } \phi(m-n_a).$$

30. The method of claim 28 wherein generating a Doppler corrected sample further comprises using values for the interpolation function stored prior to generating the samples of the received signal.

* * * * *